Jan. 31, 1933.  H. F. PITCAIRN ET AL  1,895,521
AIRCRAFT
Filed July 17, 1930    6 Sheets-Sheet 1

INVENTORS.
Harold F. Pitcairn +
Agnew E. Larsen
BY
Synnestvedt & Lechner
ATTORNEYS Patented Jan. 31, 1933

1,895,521

UNITED STATES PATENT OFFICE

HAROLD F. PITCAIRN, OF BRYN ATHYN, AND AGNEW E. LARSEN, OF HUNTINGDON VALLEY, PENNSYLVANIA, ASSIGNORS TO AUTOGIRO COMPANY OF AMERICA, OF PHILADELPHIA, PENNSYLVANIA, A CORPORATION OF DELAWARE

AIRCRAFT

Application filed July 17, 1930. Serial No. 468,598.

This invention relates to aircraft and is more particularly concerned with the type of aircraft in which the primary sustaining means takes the form of a blade or plurality of blades or wings which are adapted to be driven or actuated by the relative atmospheric air-flow.

More specifically the present invention relates to a novel arrangement and construction of tail elements for an aircraft, particularly of the type referred to above, as well as to a novel control mechanism for the movable elements of the tail structure. In order that the objects and advantages of the present invention may appear as clearly as possible, a brief discussion of various features and characteristics of aircraft having rotatably mounted sustaining blade means or wings is desirable and is, therefore, presented herebelow.

In machines of this character the propelling force is preferably derived from an engine and propeller, which may be mounted at the front of the aircraft and lifting or sustaining of the aircraft is effected by means of a system of rotatably mounted blades which are preferably arranged to revolve about a common axis and are actuated by the flow of air resulting from movement of the machine with relation to the atmosphere, the blades being pivotally mounted or otherwise arranged so that they are free, preferably independently, to assume various positions under the influence of centrifugal, lift, and other forces.

In addition to the foregoing, it should be borne in mind that the rotatably mounted blade or wing system, being located above the fuselage of the aircraft, necessarily raises the center of gravity of the craft as a whole, it being noted that the blade or wing system is ordinarily mounted a substantial distance above the fuselage of the craft in order to prevent any portion of the rotative system from fouling on any part of the aircraft such, for example, as the tail structure thereof.

Generally considered, it is the primary object of the present invention to improve the efficiency, stability, and controllability, particularly of aircraft of the above outlined general type.

More specifically, the present invention has in view the provision of novel means for actuating the rotative sustaining blade or wing system prior to and in preparation for taking off from the ground, the said means including a novel tail structure or construction, certain surfaces of which are movable or adjustable to cause a deflection of air-flow or of at least a portion of the slip-stream of the propelling means of the craft upwardly thru the general path of travel of the rotative supporting blades or wings. In addition the present invention contemplates the provision of novel control mechanism for various of the air-surfaces of the tail construction including means for moving certain of said surfaces to deflecting position and means acting under the influence of the effect of the air-flow or slip-stream thereon for maintaining the said surfaces in deflecting position.

Still further, the present invention has in view the provision of a novel tail structure of the type above referred to including substantially vertically disposed surfaces or aerofoils which serve to effect lateral and directional stability and control of the craft as well as to prevent lateral dispersion of the slip-stream when the same is being deflected upwardly toward the rotative sustaining blades or wings for starting purposes. The vertically disposed aerofoils preferably are arranged in such manner as to provide a relatively great stabilizing or controlling effect while lying within relatively small overall vertical dimensions. In this connection it should be borne in mind that, as is well known in the art, aerofoil surfaces are most efficient when they have a relatively high aspect ratio. In order to obtain efficient lateral and directional stabilization and control, therefore, the tail construction is arranged to include a plurality of vertically disposed surfaces arranged transversely of the aircraft so that the desirable efficiency is secured while maintaining the entire structure within a relatively small overall height. Such a structure is advantageous not only for constructional reasons, but also in view of the fact that the rotative blade or wing system may be mounted closer to the fuselage without danger of the blades or wings striking or fouling on the tail. This, in turn, is advantageous as it avoids an undesirably high center of gravity of the aircraft as a whole.

How the foregoing, together with other objects and advantages, are obtained will be clear from a consideration of the following description taken with the accompanying drawings which illustrate the preferred embodiment of the invention, and in which—

Figure 1:
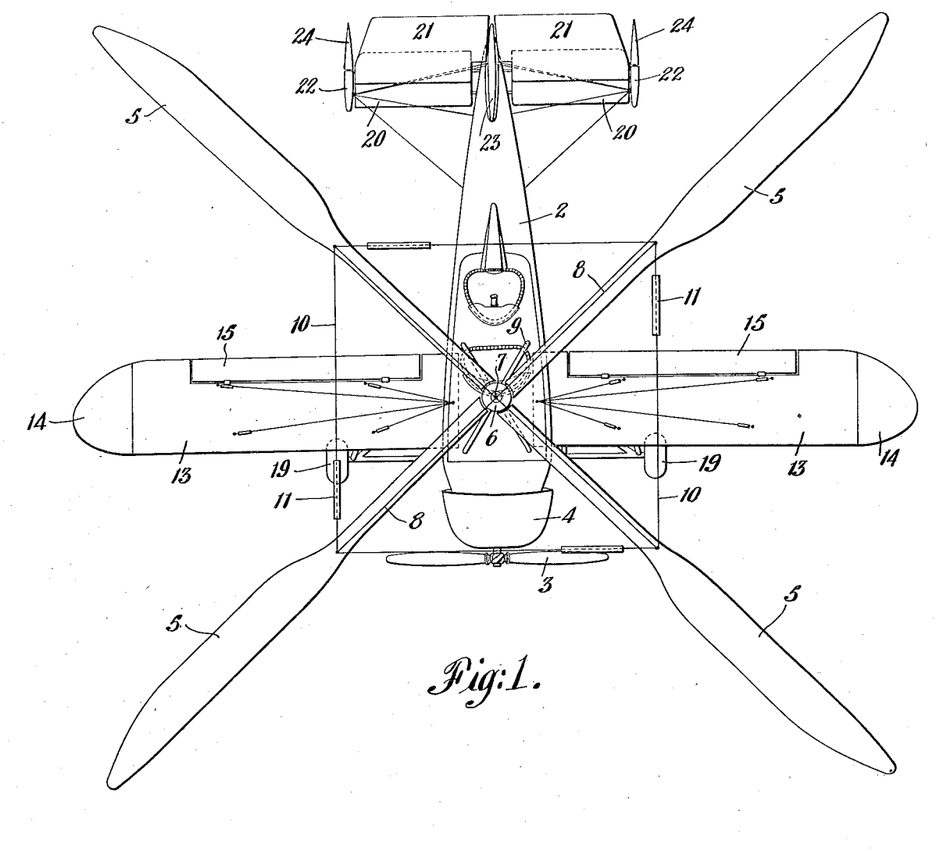
Figure 1 is a plan view of an aircraft with rotative blades or wings, embodying our improvements (certain details being omitted for the sake of clarity)
Figure 2:
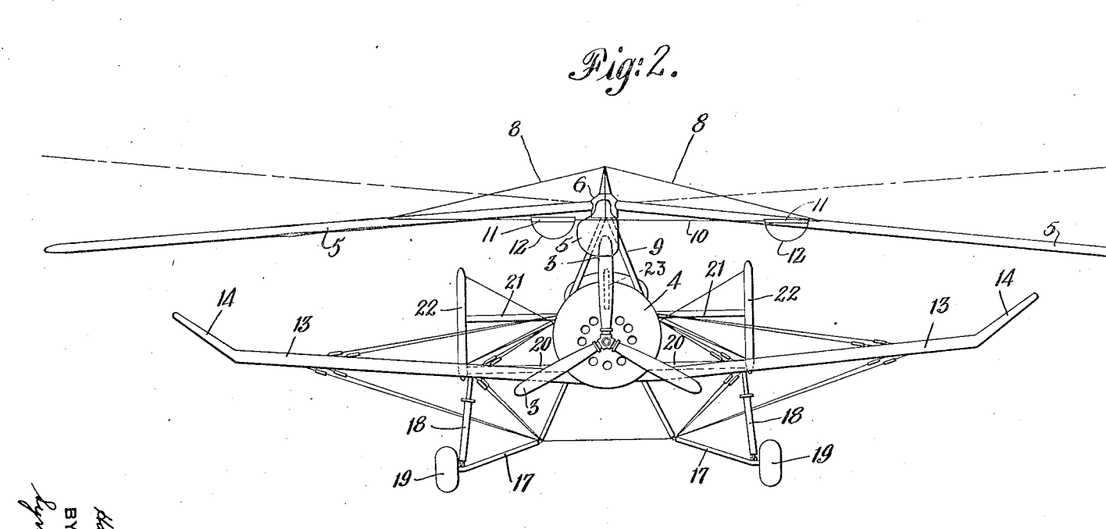
Figure 2 is a front elevational view of the aircraft of Figure 1, with the rotative blades or wings turned to a position 45° from that shown in Figure 1.
Figure 3:
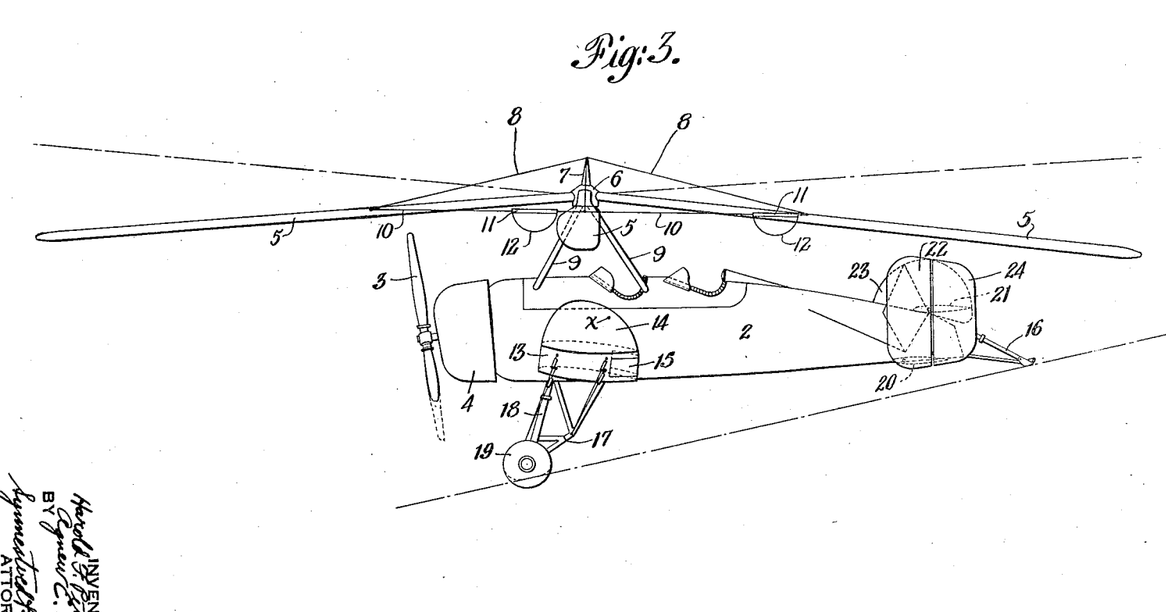
Figure 3 is a side elevation of the aircraft, with the rotative blades or wings in the position of Fig. 2.

By reference first to Figures 1, 2 and 3, it will be seen that we have illustrated an aircraft having a body or fuselage 2, at the front of which is the propelling means comprising a propeller 3 which may be driven by any suitable means such as an engine enclosed in the cowling 4; and above which is the usual sustaining unit or rotor, now commonly used on this type of aircraft, comprising a plurality of wings or blades 5 (four being here shown, although it will be understood that more or less than four may be employed) which may either be made flexible, as shown in patent to Harold F. Pitcairn, No. 1,718,577, issued June 25, 1929, or, as shown in the copending application of Juan de la Cierva, Serial No. 414,901, filed December 18th, 1929, may be pivotally mounted, or a combination of such arrangements may be employed, so that said blades may be free, preferably independently, to compensate or adjust themselves to variations in centrifugal, lift, and other forces.

The sustaining blades 5 are preferably mounted to revolve about a common axis or shaft (not shown) enclosed within the casing 6, above which is arranged the cone or rotor head tip 7, mounted to revolve or rotate with the system of blades and the casing 6. In order to support the blades when they are inactive, supporting or tension wires 8 are secured at or near the apex of the cone 7 and extend therefrom to the blades of the wing system. The entire rotative wing system is supported above the fuselage of the aircraft by means of the struts or legs 9 and in order to prevent undue displacement of the blades angularly in their general plane of rotation (see Figures 1 and 2) when they are revolving at slow speeds or are at rest, they may be flexibly interconnected by means, such as cables 10, in each of which an elastic, such as the rubber shock absorber 11, may be interposed. As a precautionary measure the flexible members 11 may be jumped, or by-passed by a slack section of cable 12, as best shown in Figure 2.

As seen in Figures 1 to 3 we have provided the aircraft with auxiliary or supplemental sustaining means comprising, in the preferred embodiment herein illustrated, a pair of substantially fixed wing members 13 extending laterally from the lower portion of the fuselage 2 and provided, at their outer ends, with upturned tip portions 14 serving, automatically, to effect certain lateral stability of the aircraft. In addition, the wing sections 13 serve to support adjustable or aileron surfaces 15.

As will be seen from Figures 2 and 3, the aircraft is also provided with a tail skid 16 and suitable landing gear, including the bracing structure 17, shock absorbers 18 and wheels 19, the wheels preferably being resilient or flexible, as in the all-rubber type, so that the wheels and shock absorbers together will provide sufficient vertical travel to take the final thrust of the vertical descent of which the machine is capable.

The foregoing general construction of the craft is not, per se, a part of the present invention, but is described in detail because of its relation to other parts of the aircraft as will appear hereinafter.

In accordance with the present invention the tail structure includes a pair of airsurfaces or stabilizers 20, 20, (see Figures 4 and 5, particularly) arranged on opposite sides of the fuselage and normally serving as longitudinal or horizontal stabilizing elements and a pair of air-surfaces 21, 21, similarly arranged and positioned in staggered relation with respect to the surfaces 20 and normally serving as the usual elevator control. That is, each of the surfaces 21, respectively, is arranged above and at least partially rearward of one of the surfaces 20.

In addition, the tail structure includes the stationarily mounted and vertically disposed fins or stabilizers 22 arranged at opposite ends of the intervening, substantially horizontally disposed surfaces 20 and 21 and a third surface 23 supported above the fuselage 2, preferably in line therewith and faired thereinto, and extended rearwardly and downwardly between the surfaces 21. Rudder members or surfaces 24 are preferably arranged in back of and in line with the elements 22. The rudder surfaces are connected to the rudder controls 25, in a cockpit of the aircraft, by means of the cables 26, rocker members 27, cables 28, and the crank levers 29, the rudders pivoting about the vertical axes 30. At this point it might be noted that the rudders 24 as well as the stabilizers 22 serve to prevent lateral dispersion of the air-flow when the horizontal surfaces 20 and 21 are being employed to deflect the same toward the sustaining wings. Attention is also called to the fact that the fixed surfaces 22 and 23 as well as the rudders 24 are arranged in such manner as to provide the desirable relatively high aspect-ratio and at the same time to permit the sustaining blades to be mounted relatively close to the fuselage. The result is that a high degree of efficiency is afforded by these surfaces and the center of gravity of the craft as a whole (see $x$ in Fig. 3) is brought down to a point lower than possible heretofore.

Figure 4:
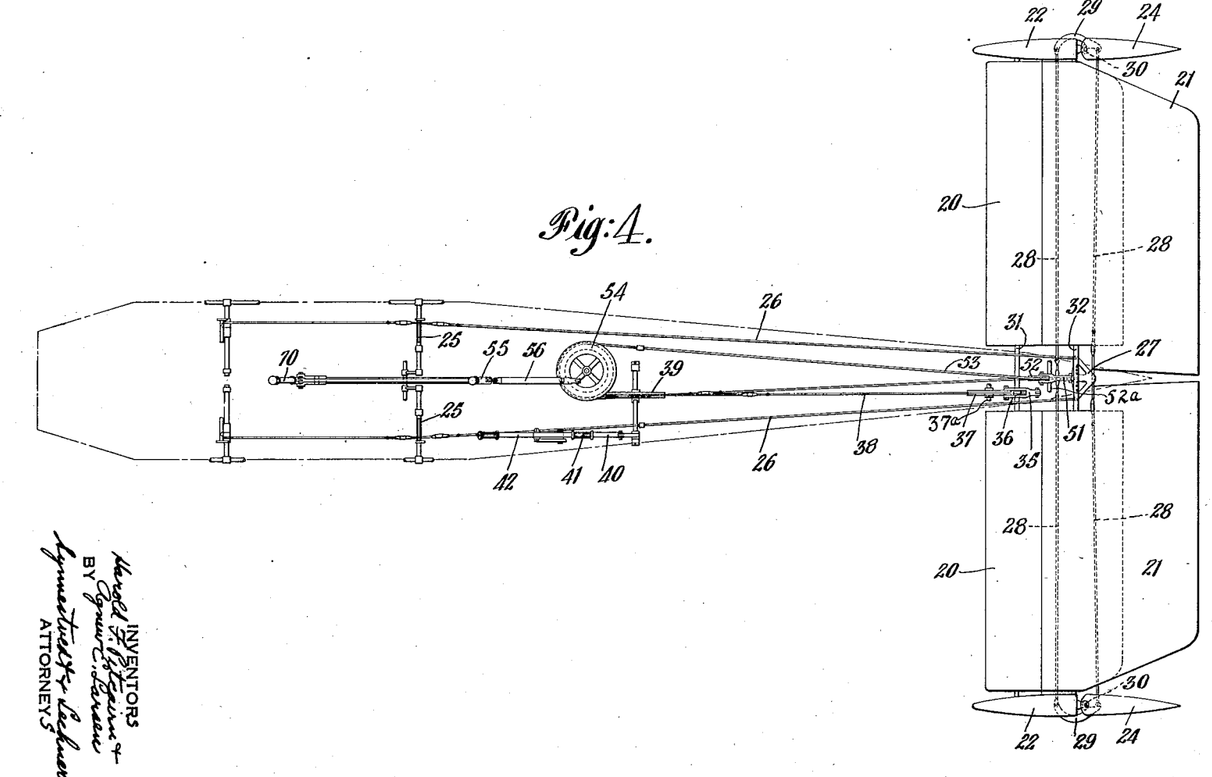
Figure 4 is a somewhat diagrammatic plan view of the tail structure and the controlling mechanism therefor.
Figure 5:
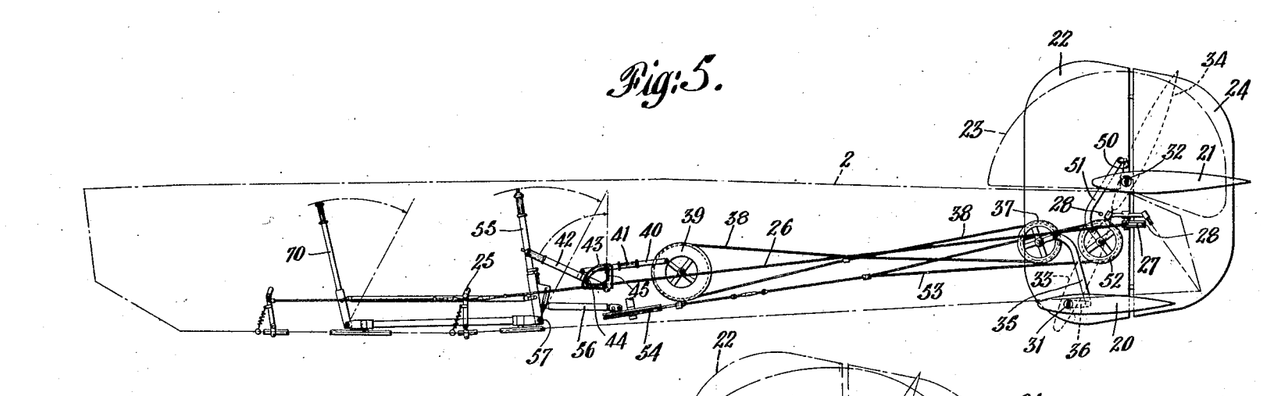
Figure 5 is a somewhat diagrammatic side view of the apparatus illustrated in Figure 4.
Figure 8:
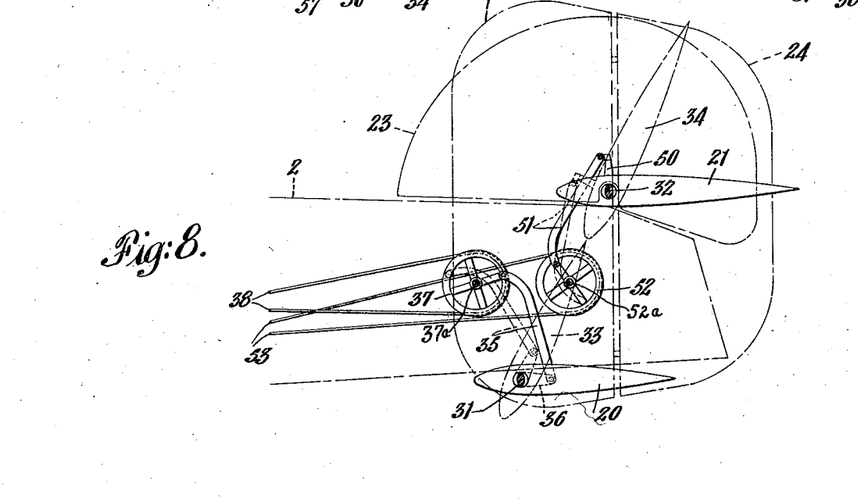
Figure 8 is an enlarged detailed view of a part of the construction shown in Figure 5.

By further reference to Figures 4 and 5 it will be seen that each one of the aerofoils 20 and 21 is mounted to rotate about a substantially horizontally disposed axis, shafts 31 and 32 being provided for this purpose. The arrangement and relative position of the surfaces 20 and 21 is such that, when they are rotated to a position in which they are inclined upwardly, and rearwardly (see dotted line showings 33 and 34 in Figures 5 and 8) they cooperate with each other in forming substantially complete or unbroken deflecting surfaces, one at each side of the fuselage.

Figures 6, 7:
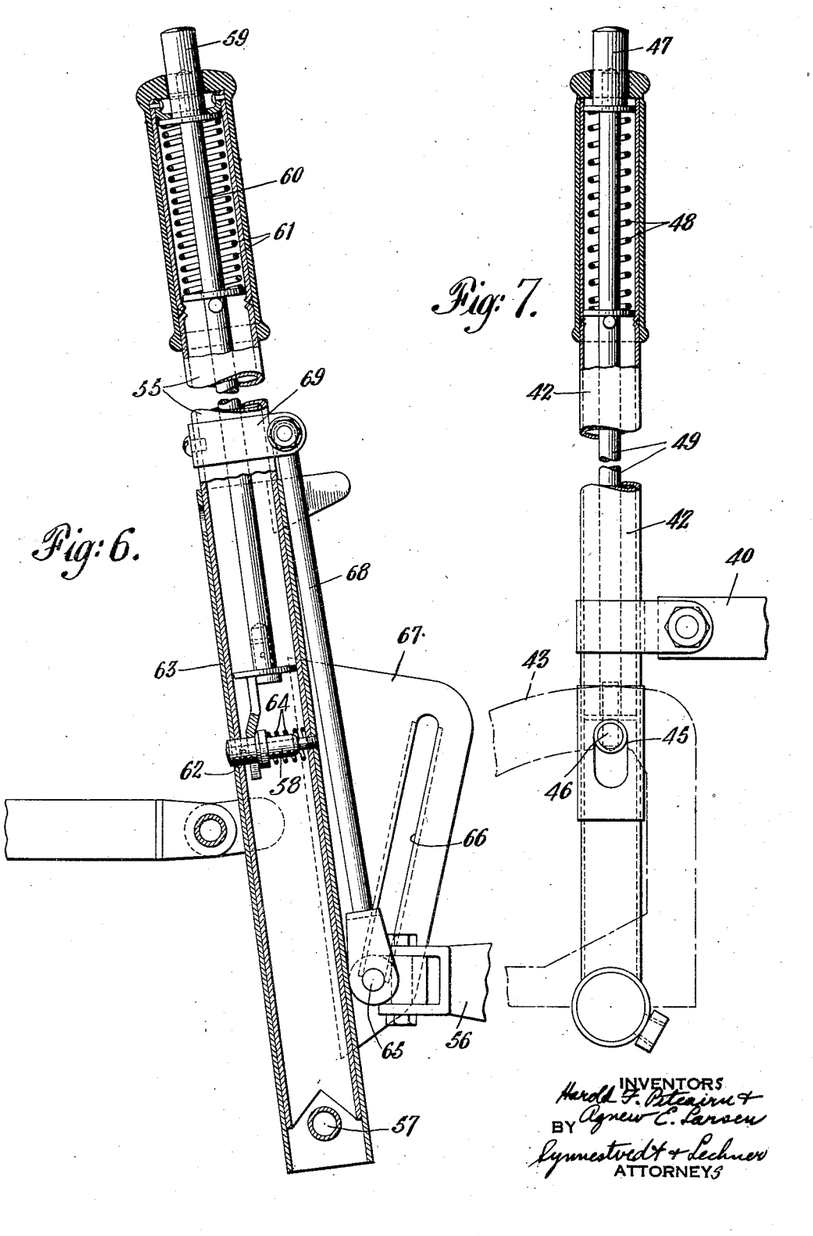
Figures 6 and 7 are enlarged detailed views of certain of the manually operable control elements for the tail structure.

Adjustments of the aerofoils 20 are effected by means of a lever 35 which is secured at one end to a crank 36 fixed on the shaft 31 and at the other end to a pulley wheel 37 which is coupled by means of the cable 38 with the wheel 39. Movement of the wheel 39 is effected, in turn, by means of the link 40, having length adjustment means 41, and being secured to the wheel near or at its periphery. The other end of the link 40 extends to the manually operated control 42, preferably mounted in a cockpit of the fuselage. By reference to Figs. 5 and 7 it will be seen that a two-position quadrant 43 is associated with the control 42 and is provided with notches or recesses 44 and 45 adapted to receive the pin 46 carried by the control 42. This pin may be actuated to disengage either of the notches 44 and 45 of the quadrant by depressing the button 47 at the extremity of the control lever 42 against the pressure of spring 48, the said pin being mounted on the rod 49 which is directly secured to the button 47.

It might also be noted at this point that the surfaces 20 are normally retained in their substantially horizontal position (shown in full lines in Figure 5), while the aircraft is in flight, the other adjustment thereof being provided for deflecting purposes as will appear more fully hereinafter.

The aerofoil or elevator surfaces 21, as already noted, normally serve to control the longitudinal attitude of the aircraft while in flight and to this end the shaft 32 on which these surfaces are mounted is provided with a crank 50, to the outer end of which one end of the link 51 is secured. The other end of the link 51 is operatively connected to the wheel 52, which, in turn, is coupled by means of the cable 53 to the wheel 54. The normal control of the surfaces 21 is effected by fore and aft movements of the usual control stick 55 which is coupled to the wheel 54 in such manner as to impart rotation thereto, by means of a connecting link 56.

In order to impart additional movement to the wheel 54 and thus to the surfaces 21 when it is desired to employ the same for deflecting purposes, we have provided means for moving the point of attachment of the connecting link 56 with the control 55 upwardly and rearwardly and thus away from the pivot point 57 of the latter, with the result that a greater movement is imparted to the link 56, as well as to the remainder of the operating connections to and including the surfaces 21, for a given throw or movement of the control 55. The effect of this arrangement is to avoid an unduly extended rearward throw of the control stick when it is desired to employ the surfaces 21 for deflecting purposes so that, when so operated, the control stick does not strike the pilot or interfere with his position in the cockpit. At the same time the control 55 is properly positioned with respect to the pilot's seat in the cockpit for all normal flight adjustments or movements. The mechanism for accomplishing the movement of the pivot point 57 referred to above (see Fig. 6) includes a catch 58 mounted within the control stick 55 and actuable by means of the button 59 through shaft 60 and so arranged that upon depression of the button against the pressure of spring 61 the catch is moved out of engagement with the opening 62 in the sleeve 63 against the pressure of the spring 64. With the button 59 so depressed the control stick may be raised or moved partway out of the sleeve or socket 63. This, in turn, moves the pin 65 at the forward end of link 56 upwardly in the slot 66 of the guide or bracket 67, the movement being effected by means of a coupling 68 which is secured, at one end, to the pin 65 and, at the other end, to a bracket 69 mounted on the stick 55.

It might also be noted, at this point, that the various levers, wheels and links of the entire controlling mechanism are so relatively arranged and positioned that upon adjustment thereof to move the surfaces 20 and 21 into deflecting position, they automatically retain the said surfaces in such position without imposing any load on or exerting any force to move any of the manually controllable levers. This is accomplished by operation of the wheels and links 35, 37, 51 and 52 after the manner of toggles, the air-flow or slip-stream striking surfaces 20 and 21 serving to positively retain the said surfaces in deflecting position. In this connection see dotted line showing of levers 35 and 51 in Fig. 8 from which it will be observed that the line of pull on the links is so arranged with respect to the centers of the wheels 37 and 52 as to prevent movement thereof (clockwise, in Fig. 8) while the slip-stream force is applied to the deflecting surfaces. Counter clockwise movement of the wheels 37 and 52 beyond the point of toggle locking is prevented by contact of the curved portions of the links, respectively, with the shafts 37a and 52a of wheels 37 and 52.

Still further, if desired, the normal elevator adjustments may be effected by means of an additional control stick 70, preferably positioned in the forward cockpit of the aircraft and coupled with the stick 55 after the manner of the usual dual control.

In operation, it should be observed that either one or both of the normally horizontally disposed aerofoils of the tail structure 20, 21, may be moved or rotated to deflecting position as above described in order to initiate rotation of the wing system prior to taking off from the ground.

In addition to the above it is to be noted that the controlling mechanism provides for positively maintaining or locking the normally substantially horizontally disposed surfaces of the tail structure in deflecting position without exerting any force or imposing any load on the manually operable control members. Still further, attention is called to the fact that the device 41 for altering the effective length of the link 40 serves to adjust the amount of movement imparted to the normally fixed surfaces 20 when the control 42 therefor is moved to effect a deflection of slip-stream. The device 41 primarily, however, is provided to alter the angle of incidence of the surfaces or aerofoils 20 when such surfaces occupy their normal flight position as stabilizers. Such adjustment of the stabilizing surfaces is advantageous in balancing the ship longitudinally under varying load conditions to prevent tail or nose heaviness. In other words we have combined a flight stabilizer adjustment with our improved deflecting adjusting device.

In conclusion, it is to be noted that the construction of the present invention is simple and rugged as well as readily operated from a cockpit of the aircraft. In addition, the vertically disposed surfaces of the tail structure are so arranged and proportioned as to provide a high degree of efficiency without occupying an unduly extended vertical space. The rotatably mounted wing system, therefore, may be mounted relatively near to the fuselage of the craft without danger of fouling of the wings or blades on any part of the tail construction.

Finally, attention is called to the novel control mechanism for the rudders 24, including the crank levers 29, the cables 28 and the rocker member 27. This construction avoids the use of any compression members for actuating the rudders which would have to be of considerable length in a wide tail structure such as we have devised, and thus reduces the weight, ensures relatively rigid or positive actuation of the rudders and reduces vibrations thereof to a minimum.

The double box-like tail, as we term it, divides, both for normal flight and for deflecting purposes, the flow of air into a plurality of streams, which are more or less enclosed, and thus increases the efficiency of the tail surfaces, both as controls and as means of guiding or deflecting the slip-stream against the rotor for starting. The mounting of the central fin more or less as a continuation of the fuselage serves to increase this effect.

The expressions "air-surface" and "air-surfaces" as used in the appended claims, unless otherwise modified or limited, refer to any of the stabilizing or control surfaces or elements, whether they are normally fixed or are normally adjustable or controllable.

What we claim is:—

1. In an aircraft having propelling means and a sustaining blade system mounted for rotation by relative air-flow, a control surface for the aircraft, means whereby said surface may be utilized to deflect slip-stream from the propelling means against the sustaining blade system, and means acting under the influence of the effect of the slip-stream on said surface for maintaining the same in deflecting position.

2. In an aircraft having propelling means and a sustaining blade system mounted for rotation by relative air-flow, air-surfaces for the aircraft, means whereby at least one of said surfaces may be utilized to deflect slip-stream from the propelling means against the sustaining blade system, and means acting under the influence of the effect of the slip stream on said surfaces for maintaining said first-mentioned means in effective position, said last mentioned means including a toggle device.

3. In an aircraft having propelling means and a sustaining blade system mounted for rotation by relative air-flow, air-surfaces for the aircraft, means whereby at least one of said surfaces may be moved to a position to deflect air-flow thru the path of travel of the sustaining blade system, and means under the influence of said air-flow adapted to maintain said surface in deflecting position.

4. In an aircraft having propelling means and a sustaining blade system mounted for rotation by relative air-flow, an air-surface for the aircraft, means whereby said surface may be moved to a position to deflect air-flow thru the path of travel of the sustaining blade system, and means under the influence of said air-flow adapted to automatically maintain said surface in deflecting position.

5. In an aircraft having propelling means and a sustaining blade system mounted for rotation by relative air-flow, air-surfaces for the aircraft, a control member for at least one of said surfaces to move the same to a position for deflecting slip-stream from the propelling means thru the path of travel of the sustaining blade system, and means whereby said slip-stream acting on said surface relieves the control member from the slip-stream pressure.

6. In an aircraft having propelling means and a sustaining blade system mounted for rotation by relative air-flow, control surfaces for the aircraft, means whereby at least one of said surfaces may be moved to a position to deflect air-flow thru the path of travel of the sustaining blade system, and means under the influence of said air-flow adapted to maintain said surface in deflecting position.

7. In an aircraft having propelling means and a sustaining blade system mounted for rotation by relative air-flow, a control surface for the aircraft, means whereby said surface may be utilized to deflect air-flow against the sustaining blade system, and means acting under the influence of the effect of air-flow on said surface for maintaining the same in deflecting position.

8. In an aircraft having propelling means and a sustaining blade system mounted for rotation by relative air-flow, air-surfaces for the aircraft, means whereby at least one of said surfaces may be utilized to deflect slip-stream from the propelling means against the sustaining blade system and means acting under the influence of the effect of the slip-stream on said surfaces for maintaining said first-mentioned means in effective position, said last mentioned means including a toggle device, a control lever and interconnections therebetween.

9. In an aircraft having propelling means and a sustaining blade system mounted for rotation by relative air-flow, a normally substantially horizontally disposed stabilizing surface and means for moving said surface to a position to cause a deflection of slip-stream from the propelling means upwardly against the sustaining blade system to initiate rotation thereof, said means including a manually operable control element and an adjustable operating connection between the element and said surface.

10. In an aircraft having propelling means and a sustaining blade system mounted for rotation by relative air-flow, a normally substantially horizontally disposed stabilizing surface and means for moving said surface to a position to cause a deflection of slip-stream from the propelling means upwardly against the sustaining blade system to initiate rotation thereof, said means including a manually operable control element and an operating connection between the element and said surface, adjustable, when the parts occupy their normal flight position, to alter the angle of incidence of said surface.

11. An aircraft having propelling means, sustaining blade means mounted above the craft for rotation by relative air-flow and a tail structure including at least three substantially vertically disposed air-surfaces spaced from each other transversely of the craft, and substantially horizontally disposed air-surfaces between the surfaces first mentioned, the latter having means for effecting normal flight control movements and means for effecting relatively greater movement for deflecting air-flow upwardly in a plurality of streams.

12. An aircraft having propelling means, sustaining blade means mounted above the craft for rotation by relative air-flow and a tail structure including at least three substantially vertically disposed air-surfaces spaced from each other transversely of the craft, and substantially horizontally disposed air-surfaces between the surfaces first mentioned, the latter having means for effecting normal flight control movements and means for effecting relatively greater movement for deflecting air-flow upwardly in a plurality of streams, at least one of said vertical surfaces being disposed substantially in alignment with or as a continuation of the fuselage of the aircraft whereby a division of the air-flow into said plurality of streams is enhanced and control is improved.

13. An aircraft having a tail structure of relatively greater width than height including pivotally mounted substantially horizontal air-surfaces, transversely spaced-apart vertical air-surfaces supported at least in part by the pivotal mountings and including rudder means, and control mechanism for the rudder means including tension means extending therebetween.

14. An aircraft having a tail structure of relatively greater width than height including pivotally mounted substantially horizontal air-surfaces, transversely spaced-apart vertical air-surfaces supported at least in part by the pivotal mountings and including rudder means, and control mechanism for the rudder means including tension means extending therebetween, a rockable member, and tension means interconnecting the latter and the rudder means.

15. An aircraft including an air-surface normally serving as an elevator, a manually operable control member for said surface mounted for pivotal movement, an operating connection between said member and said surface attached to said member at a point spaced from its pivot, and means associated with said member for varying the amount of movement of the surface resulting from a given throw of said member, said means including a device whereby the said point of attachment may be moved with respect to the pivot point of said member.

16. An aircraft including a sustaining blade system mounted for rotation by relative air-flow, an air-surface normally serving as an elevator, a manually operable control member for said surface, an operating connection between said surface and said member, and a mechanism whereby said surface may be moved to a position to deflect air-flow upwardly through the path of travel of the sustaining blade system, said mechanism including means associated with said member for increasing the amount of movement of said surface over that which normally results from a given throw of said member.

17. An aircraft including a sustaining blade system mounted for rotation by relative air-flow, an air-surface normally serving as an elevator, a manually operable control member for said surface mounted for pivotal movement, an operating connection between said member and said surface attached to the said member at a point spaced from its pivot, and a mechanism associated with said member whereby said surface may be moved to a position to deflect air-flow upwardly through the path of travel of the sustaining blade system, said mechanism including means for moving the said point of attachment away from the pivot point of said member to impart a movement to said surface greater than that which normally results from a given throw of the control member.

18. An aircraft including a rotatable sustaining blade system mounted above the body thereof, and a tail structure including at least three substantially vertically disposed air-surfaces of relatively small overall height but high aspect ratio, and positioned to divide air stream, whereby, with a blade system mounted at a given height above the body of the craft, relatively great directional stability of the craft and, at the same time, considerable clearance, between the said air-surfaces and the said system, are provided.

19. An aircraft including a rotatable sustaining blade system mounted above the body thereof, and a tail structure including at least three substantially vertically disposed air-surfaces of relatively small overall height but high aspect ratio, whereby, with a blade system mounted at a given height above the body of the craft, relatively great directional stability of the craft and, at the same time, considerable clearance, between the said air-surfaces and the said system, are provided, the said surfaces being spaced transversely of the craft and one of them being arranged substantially in alignment with or as a continuation of the body of the craft.

20. An aircraft including a rotatable sustaining blade system mounted above the body thereof, and a tail structure including at least three substantially vertically disposed air-surfaces of relatively small overall height but high aspect ratio, and positioned to divide air stream, whereby, with a blade system mounted at a given height above the body of the craft, relatively great directional stability of the craft and, at the same time, considerable clearance, between the said air-surfaces and the said system, are provided, together with substantially horizontally disposed air-surfaces between the surfaces first mentioned.

21. An aircraft including a rotatable sustaining blade system mounted above the body thereof, and a tail structure including at least three substantially vertically disposed air-surfaces of relatively small overall height but high aspect ratio, whereby, with a blade system mounted at a given height above the body of the craft, relatively great directional stability of the craft and, at the same time, considerable clearance, between the said air-surfaces and the said system, are provided, the said surfaces being spaced transversely of the craft and one of them being arranged substantially in alignment with or as a continuation of the body of the craft, together with substantially horizontally disposed air-surfaces between the surfaces first mentioned.

In testimony whereof we have hereunto signed our names.

AGNEW E. LARSEN.
HAROLD F. PITCAIRN.